United States Patent [19]

Ritzmann

[11] Patent Number: 5,160,811
[45] Date of Patent: Nov. 3, 1992

[54] DUCT TRANSITION CONVERTER AND FLEXIBLE CONNECTORS INCLUDING SAME

[75] Inventor: James M. Ritzmann, Greenwood, Ind.

[73] Assignee: Tyton Corporation, Milwaukee, Wis.

[21] Appl. No.: 515,239

[22] Filed: Apr. 27, 1990

[51] Int. Cl.⁵ .................. H02G 3/28; H01B 17/58; F16B 7/04

[52] U.S. Cl. .................. 174/68.3; 174/65 R; 174/68.1; 174/70 C; 138/121; 138/156; 285/176; 285/177; 285/236; 403/223; 403/286

[58] Field of Search ............... 174/68.3, 10, 16.2, 174/72 C, 72 R, 95, 47, 65 R, 68.1, 70 C; 138/121, 156, 109, 110, 122; 285/176, 177, 178, 244, 245, 236; 403/23, 50, 51, 223, 286

[56] References Cited

U.S. PATENT DOCUMENTS

| | | | |
|---|---|---|---|
| 853,750 | 5/1907 | Whorrall | 285/176 X |
| 1,205,132 | 11/1916 | Black | 285/177 |
| 3,314,039 | 4/1967 | Opper | 174/47 X |
| 3,784,042 | 1/1974 | Hadfield et al. | 174/48 X |
| 4,214,147 | 7/1980 | Kraver | 219/301 |
| 4,274,455 | 6/1981 | Simons | 141/1 |
| 4,650,224 | 5/1987 | Smith | 138/121 X |
| 4,798,028 | 1/1989 | Pinion | 285/177 X |

FOREIGN PATENT DOCUMENTS 0016847  2/1977  Japan .................. 138/121

Primary Examiner—Leo P. Picard
Assistant Examiner—Hyung S. Sough
Attorney, Agent, or Firm—Lockwood, Alex, FitzGibbon & Cummings

[57] ABSTRACT

A universal flexible transition connector for connecting the ends of spaced apart wiring ducts is described. The connectors are flexible along six axes of change to provide a single fitting capable of making any number of gradually curved interconnections between ducts required for use in fiber optics installations. The connectors include a duct transition converter having a cuff formation in one end for gripping attachment to the multi-sided end of a first wiring duct. The opposite end of the converter includes a resilient sleeve portion for cooperatively engaging the end of a flexible tubing member. A similar converter provided on the opposite end of the flexible tubing may be connected to the second duct end to form a smooth transition connection between duct system elements of a premises wiring system.

22 Claims, 3 Drawing Sheets

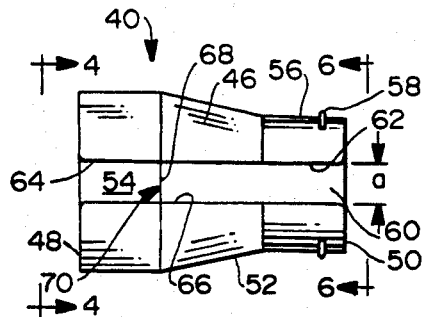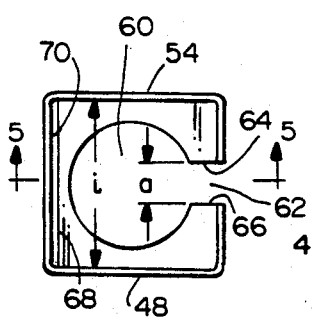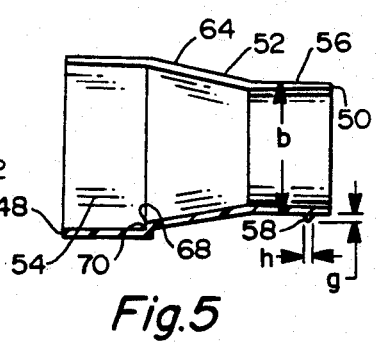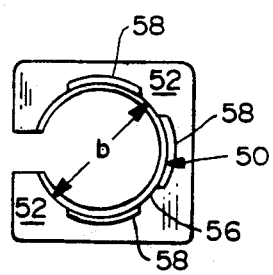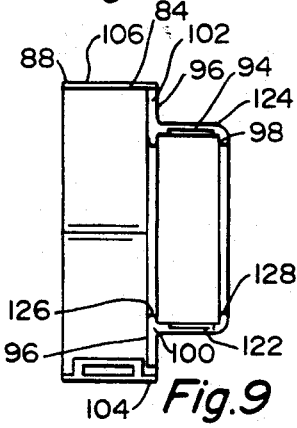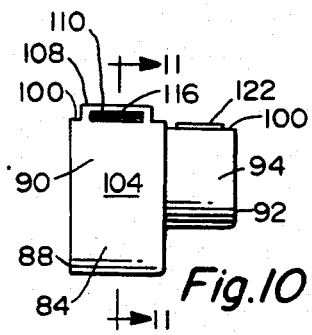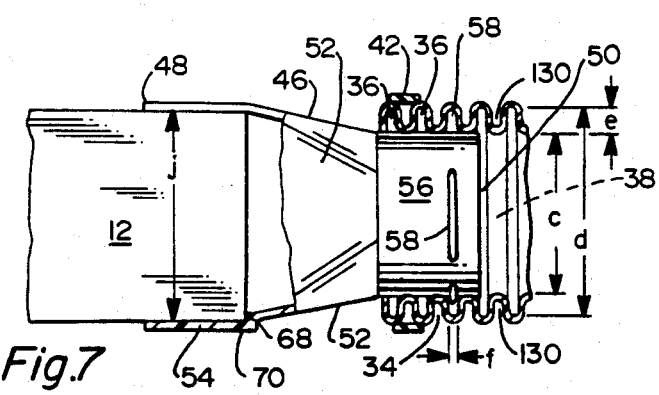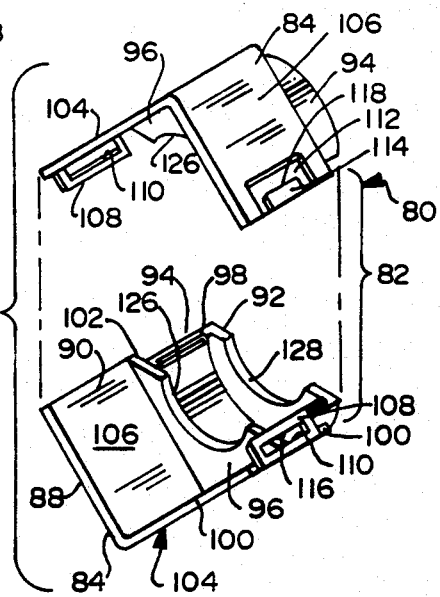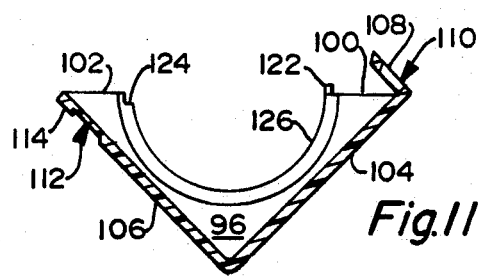

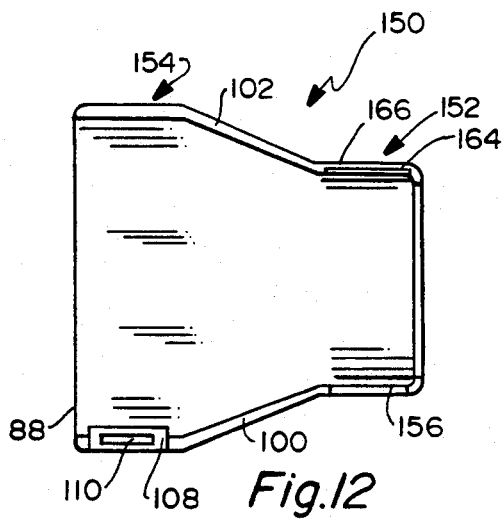
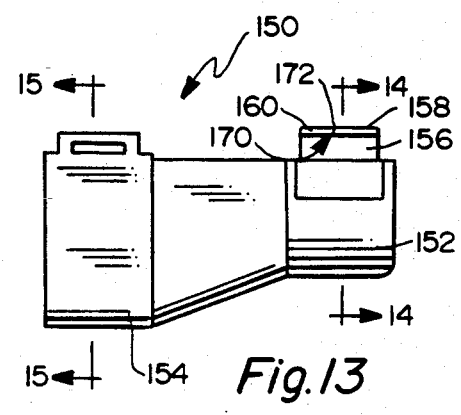
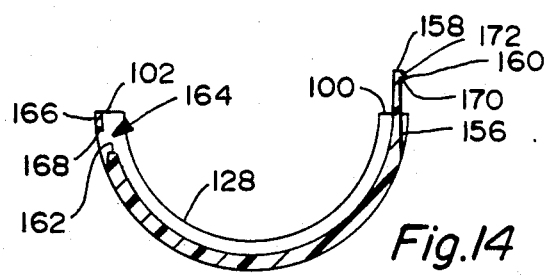
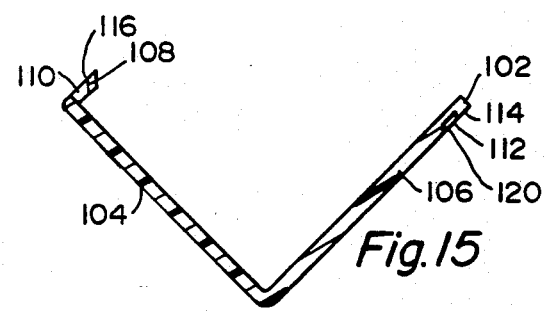
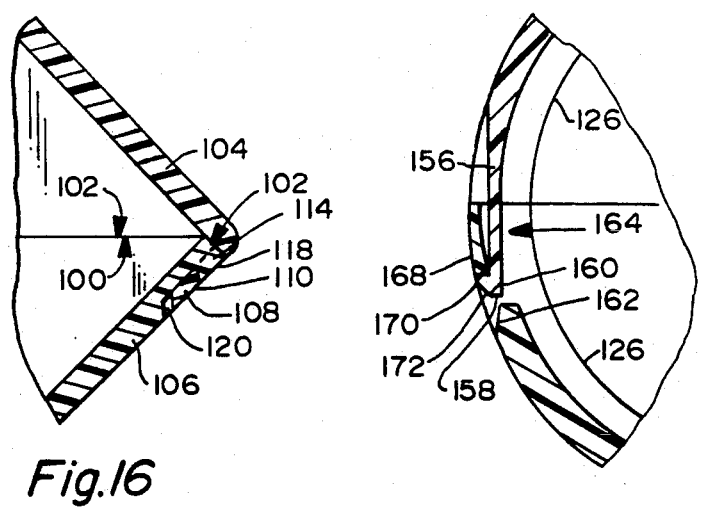
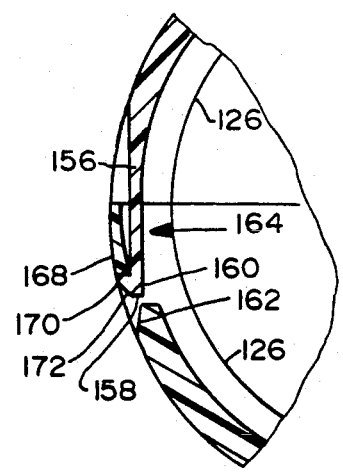

DUCT TRANSITION CONVERTER AND FLEXIBLE CONNECTORS INCLUDING SAME

BACKGROUND OF THE INVENTION

The present invention generally relates to premises wiring systems for providing power, telecommunications and data connections between a plurality of work stations or areas, generally within the same building. More particularly, it relates to a transition converter and to a flexible coupling connector for making gradual curved connections between spaced-apart wiring duct or wiring system members.

Premises wiring may include a plurality of wires or cables extending between any number of work stations and between work stations and other system elements such as junction boxes, switching stations, control panels and the like. The wires and cables to and from a given location are usually tied together to form bundles. Moreover, most bundles are disposed within wiring ducts to support the bundles, provide better wire management and to provide protection to the wires or cables making up the wiring system. The wiring ducts are mounted to wall, floor or ceiling structures. Generally, these wiring ducts are provided with a four-sided, square or rectangular cross-sectional configuration. Preferably the duct is provided with a removable cover permitting access to the wire or cable bundle housed within it, so that wires may be added, removed or replaced with relative ease.

Recently optical fiber cables have become important in premises wiring systems in both telecommunications and data transmission circuitry. This is primarily because optical fibers have much higher data transmission rates than corresponding hard wired, electrically-based systems. Moreover, optical fibers are generally unaffected by electromagnetic interference, so that purer substantially noise-free transmissions are provided. In addition, shielding and jacketing of the cables can be eliminated, making them easier and less expensive to install and use.

A major disadvantage encountered with fiber optic cables is that they cannot be sharply bent at right angles without breaking or damaging the fibers. This limitation can make it difficult to install optical fiber based circuits and systems into existing duct work as well as in new installations. For example, ducting junctions at corners of wall panels, between overhead ceiling panels and wall panels, between floor panels and wall panels and to and from junction boxes or switching stations or the like frequently require wires or cables to be bent at right angles. Moreover, building structures such as supports, columns, plumbing and previously installed duct work may require sharp bends in some installations. For circumstances in which some or all of the wiring system must include optical fiber cables, new installations and modified installations including gradual curved bends in place of sharp right angle bends must be provided.

Accordingly, it is an object of the present invention to provide a coupling connector capable of providing a gradually curved connection between the ends of spaced apart wiring duct members.

It is another object of the invention, to provide a gradually curved coupling connector capable of connecting the ends of existing wiring duct products.

It is a further object of the present invention to provide a universal flexible transition connector having six axes of change in one fitting for making gradual curved connections between ducts and ducting system elements useful in a broad range of wiring system configurations and contexts.

It is still another object of the present invention to provide a transition coupling for connecting the end of a multi-sided wiring duct member to the cylindrical end of a flexible tubing duct member for making gradually curved bends in a wire or cable duct system.

SUMMARY OF THE INVENTION

In accordance with these and other objects, the present invention provides a new and improved wiring duct converter and flexible transition connector for making gradual bended coupling connections between spaced apart wiring duct system elements. The new and improved wiring duct converter is provided for making a transition connection between an end of a multi-sided ducting member and an end of a cylindrical ducting member. The converter comprises an elongate, generally tubular- converter body having a cross sectional configuration which varies along the length thereof. A first end of the converter body includes a resilient cuff portion for clampingly engaging the end of the multi-sided duct. The converter body also includes an opposed second end having an elongate sleeve portion provided with means for cooperatively engaging the end of the cylindrical duct member. An intermediate transition section of the converter body extends between the cuff portion and the sleeve portion.

The converter body defines an internal passageway for receiving a plurality of wires or cables. A side opening along the converter body provides lateral access to the passageway to permit wires or cables to be added to or removed from the passageway in use.

The converter body is preferably a one-piece or unitary thermoplastic molding having a resilient generally C-shaped cross-sectional configuration along its length. Alternatively, the converter body may be formed from a pair of housing parts, preferably hermaphroditic housing halves, which include releasable locking features for locking the housing parts together to form the converter body. For these multi-piece converter body embodiments, access to the passageway is provided by opening up the housing parts.

The present invention also provides a new and improved flexible transition connector for connecting the end portions of a pair of spaced apart wiring duct members. The transition connector includes a length of flexible tubing extending between a pair of opposed ends. A pair of the new and improved transition converters of this invention are affixed to the flexible tubing so that their respective sleeve portions cooperatively engage an end of the flexible tubing. In accordance with a preferred embodiment, the converters are unitary and their sleeve portions are telescopically received in and biasingly engage the ends of the flexible tubing. In accordance with alternative hermaphroditic converters, the ends of the flexible tubing may be telescopically received and engaged within the sleeve portions of the converters. In accordance with the preferred embodiments releasable cinch clamp means are preferably included to provide added strain relief for maintaining the cooperative engagement between the ends of the flexible tubing and the sleeve portions of the converters.

The flexible transition connectors are matable by means of the terminal cuff portions of the installed converters to the ends of available or existing wiring duct system members. The flexible transition connectors permit ducting to be gradually redirected along six axes of change to connect with another spaced apart duct system element. The new and improved flexible transition connectors therefore provide a universal connector for use in most duct interconnection applications.

Other objects and advantages of the present invention will be apparent from the following detailed description of the invention.

BRIEF DESCRIPTION OF THE DRAWINGS

FIG. 3 is a top plan view of the new and improved duct transition converter of the invention;

FIG. 4 is an elevated front view of the new and improved transition converter of the invention taken along view lines 4—4 in FIG. 3;

FIG. 5 is an elevated cross-sectional view of the new and improved transition converter taken along view lines 5—5 in FIG. 4;

FIG. 6 is an elevated end view of the new and improved transition converter taken along view lines 6—6 in FIG. 3;

FIG. 7 is an enlarged side elevation view, partly in section, of the new and improved transition converter of the invention shown cooperatively engaged within an end portion of flexible convoluted tubing;

FIG. 8 is an exploded perspective view of alternate transition converter in accordance with the invention including a pair of releasable interlocking hermaphroditic housing halves;

FIG. 9 is a top plan view of one of the housing halves shown in FIG. 8;

FIG. 10 is a side elevation view of the hermaphroditic housing half shown in FIG. 8;

FIG. 11 is an elevated end sectional view of the hermaphroditic housing half taken along view line 11—11 in FIG. 10;

FIG. 12 is a top plan view of another alternate hermaphroditic housing half for making the new and improved transition converter of this invention;

FIG. 13 is a side elevation view of the housing half shown in FIG. 12;

FIG. 14 is a elevated rear end sectional view of the housing half of FIG. 12 taken along view lines 14—14 in FIG. 13;

FIG. 15 is an elevated front end sectional view of the housing half of FIG. 12 taken along view lines 15—15 in FIG. 13;

FIG. 16 is an enlarged fragmentary sectional view of a pair of mated hermaphroditic housing halves of FIG. 12 showing the releasable front end interlocking features in mated engaged condition; and FIG. 17 is an enlarged fragmentary sectional view similar to FIG. 16 showing the releasable rear end interlocking features in mated engaged condition.

DETAILED DESCRIPTION OF THE PREFERRED EMBODIMENTS

Figure 1:
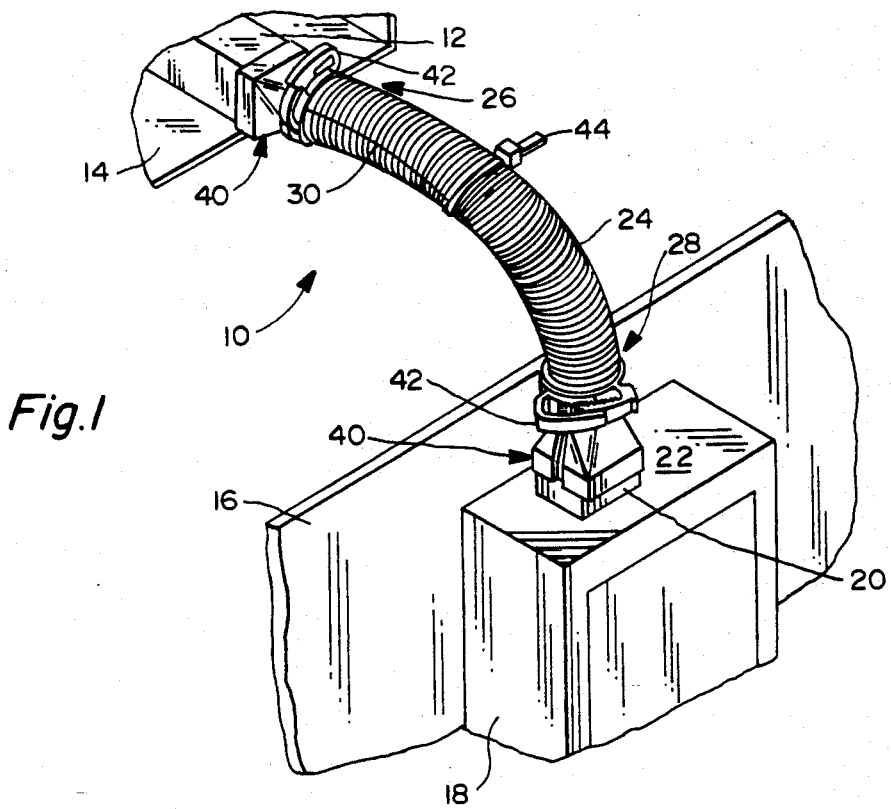
FIG. 1 is a perspective view of the new and improved flexible transition connector of the invention shown in use making a gradually curved connection between a wiring duct end associated with a ceiling panel and a wiring duct end associated with a wall mounted junction box.

Referring now to FIG. 1, the new and improved flexible transition connector, generally referred to by reference numeral 10, is shown in an illustrative and common end use application. More particularly, an overhead wiring duct 12 mounted on a planar horizontal ceiling panel 14 is shown extending adjacent a vertically extending planar wall panel 16. A junction box 18 is shown mounted to wall panel 16. A lead-in duct projection 20 extends upwardly from top wall 22 of junction box 18. As shown in FIG. 1, wiring duct 12 and duct projection 20 are four-sided structures and in the preferred embodiment depicted therein each has a generally square cross-sectional configuration. The relative orientation of overhead duct 12 with respect to the junction box lead-in 20 requires that the longitudinal axes of a plurality of wires or cables extending within wiring duct 12 be redirected through substantially a 90° angle before entering lead-in duct projection 20. In accordance with the invention, a gradually curving or bended connection may be made using preferred connector 10.

Figure 2:
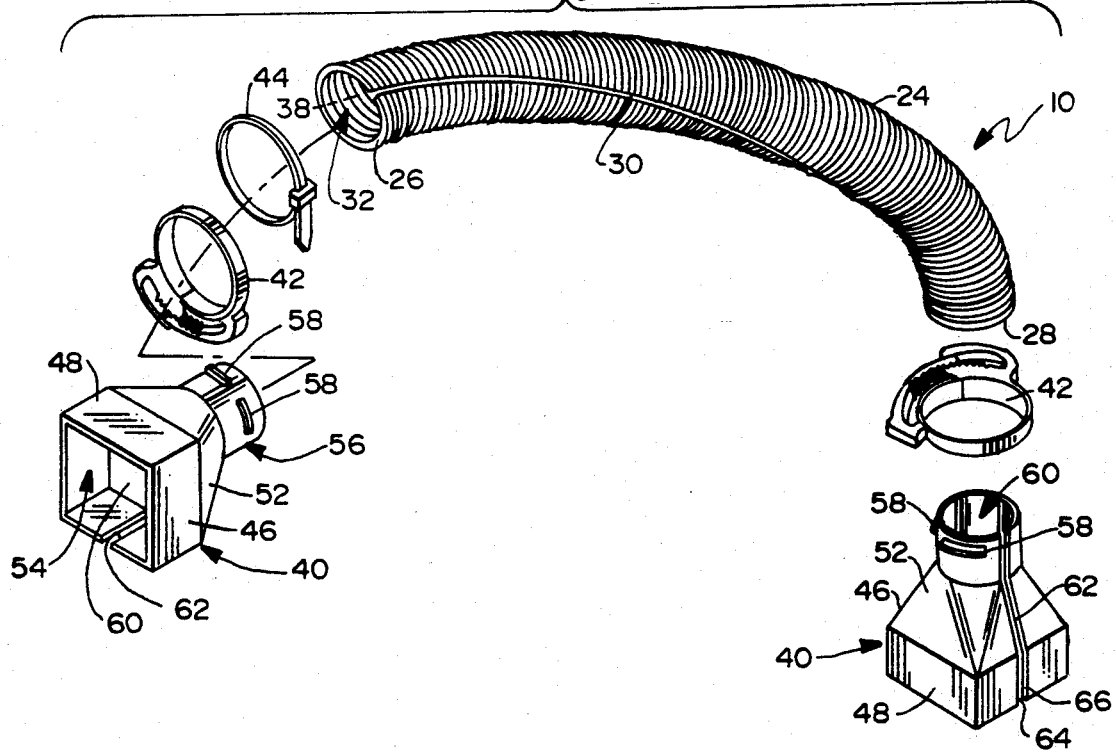
FIG. 2 is an exploded perspective view of the new and improved flexible transition connector of FIG. 1.

The flexible transition connector 10, in the preferred embodiment shown in FIGS. 1 and 2, includes a length of generally cylindrical flexible tubing 24 having a pair of opposed ends 26, 28. Flexible tubing 24 is preferably flexible convoluted tubing having a longitudinally extending axial slit 30 extending the length thereof. Tubing 24 is thereby provided with a resilient generally C-shaped configuration. Flexible convoluted tubing 24 is defined by a continuous peripheral sidewall having an inner facing surface 32 defined by a plurality of spaced apart ribs 34 alternating with a plurality of spaced apart grooves 36 as is best shown in FIG. 7. Tubing 24 includes an interior space 38 accessible through slit 30 adapted to receive a plurality of wires or cables in loose or bundled form.

Connector 10 also includes a pair of substantially identical duct transition converters 40 affixed to ends 26 and 28 of flexible tubing 24. In the preferred embodiment, connector 10 further includes a pair of substantially similar cinch or adjustable hose clamps 42 and a bundle tie 44. Further details of the structure and operation of flexible transition connector 10 will be more particularly set forth hereinafter.

In greater detail and referring now to FIGS. 1-7, the new and improved duct transition converter 40 comprises an elongate generally tubular converter body including a first end 48, an opposed second end 50 and an intermediate transition section 52 extending therebetween. The cross-sectional configuration of converter body 46 varies along its length such that the first end 48 has a square cross-sectional configuration and the second end 50 has a circular cross-sectional configuration. The transition section 52 changes from square to round along its length in such manner that transition section 52 may be characterized as being frusto-conical in nature.

First end 48 includes a resilient cuff portion 54 for making clamping engagement about a multi-sided end of a wiring duct, such as wiring duct 12 or duct projection 20. Second end 50 includes an elongate cylindrical sleeve portion 56. A plurality of radially spaced-apart vanes 58 project outwardly from the circumference of sleeve portion 56.

Converter body 46 defines an internal passageway 60 for receiving a plurality of wires or cables. An axially extending side slit or slot opening 62 is disposed along the length of converter body 46 to provide lateral access to passageway 60 to permit wires or cables to be added to or removed from passageway 60 in use. Slot opening 62 defines a pair of elongate opposing edge surfaces 64 and 66 in converter body 46. Converter body 46 has a resilient, generally C-shaped cross-sectional configuration, permitting opposing edge surfaces 64 and 66 to be elastically flexed toward or away from each other in the direction of arrow, a, shown in FIGS. 3–4.

Referring to FIGS. 4–5, a shoulder 68 defining a forward stop surface 70 is provided in interior passageway 60 between cuff portion 54 and transition section 52 opposite slot opening 62.

In the preferred embodiment shown in FIGS. 1–7, converter body 46 is a unitary or one piece body, molded from a suitable thermoplastic molding composition. Illustrative thermoplastics may include thermoplastic polyesters, polyamides, such as nylons, polycarbonates, polyolefins such as polyethylenes, polypropylenes, polyvinyl chloride and the like. Flame retardant compositions of these thermoplastics having a 94 VO rating are preferred. An especially preferred thermoplastic molding composition is a 94 VO flame retardant polyvinyl chloride composition. Thermoplastic molding compositions are abundantly commercially available from several sources.

Referring now to FIG. 7, a duct transition converter 40 is shown in a fully mated condition connecting a square end of a wiring duct, such as duct 12 or 20, to one end of flexible convoluted tubing 24. In the preferred embodiment depicted therein, sleeve portion 56 adjacent second end 50 of converter body 46 is telescopingly received through tubing end 26 so that it extends within the interior space 38 in tubing 24. As shown in FIG. 6, sleeve portion 56 is provided with an inner diameter, dimension b, which is equal to or slightly greater than the internal diameter, dimension c, of interior space 38, defined between aligned and opposed surfaces of ribs 34. Also referring to FIGS. 6–7, sleeve portion 56 is also provided with a second internal diameter, dimension d, defined by the separation distance between aligned and opposing surfaces of grooves 36. The difference between flexible tubing 24 dimensions c and d is shown as dimension e, which generally defines a length dimension to recessed areas along inner surface 32 defined by grooves 36. These same recesses have an associated width dimension, shown as dimension f, and defined between adjacent parallel radially-extending surfaces defining a groove 36.

In accordance with the preferred embodiment, sleeve portion 56 is provided with vanes 58. Vanes 58 extend normally outwardly from an outer surface of sleeve portion 56 to a height dimension, shown as dimension g in FIG. 5, which is approximately equal to dimension e of flexible tubing 24. Vanes 58 also have a width or thickness dimension h, shown in FIG. 3, which is equal to or slightly greater than the width dimension, f, of grooves 36.

As a result of its construction and dimensions, it is necessary to inwardly resiliently compress sleeve portion 56 of converter body 46 by moving elongate slot edge surfaces 64 and 66 toward each other so that vanes 58 can clear the surfaces of ribs 34 defined in inner facing surface 32 of flexible tubing or conduit 24. The second end 50 of converter body 46 is inserted until the end 26 of tubing 24 overlays substantially the entire length of sleeve portion 56, as shown in FIG. 7. Thereafter, when compressive forces on the converter body 46 are released, sleeve portion 56 resiles outwardly and edges 64 and 66 move apart to return the sleeve to its original dimension b. Consequently, the outer surfaces of sleeve portion 56 biasingly engage the surfaces of rib portions 34 defined in the inner surface 32 of tubing 24. This action tends to cause an outward flexing of tube end 26, which by virtue of the resilient construction of tubing 24, in turn causes the tube end 26 to exert a balanced resilient circumferentially inwardly directed compressive force against the sleeve portion 56. Accordingly, the resilient construction of sleeve portion 56 and flexible tubing 24 provide a cooperative, enhanced frictional biased engagement of the sleeve 56 within tube end 26 increasing the withdrawal force required to separate the converter body 46 from tubing 24.

Moreover, when sleeve portion 56 is compressed, inserted into tubing end 26 and released, the resilient expansion of sleeve portion 56 causes the vanes 58 to penetratingly enter and become engaged in an aligned groove 36 in tubing surface 32. Engagement of vanes 58 in a groove 36 effectively limits axial displacement of the tubing end 26 with respect to the sleeve portion 56 in its inserted condition. In addition, because vanes 58 are provided with a thickness dimension h which is equal to or slightly greater than the width dimension f of the groove 36, penetrating engagement of the vanes 58 into groove 36 causes an outward flexing force to be exerted against the radial sidewalls defining groove 36. Again, because of the resilient nature of flexible tubing 24, resilient balanced inwardly directed compressive or pinching forces are exerted by the groove surfaces against the vane surfaces. This cooperative engagement of the vanes 58 within the groove 36 provides an enhanced strain relief effect because a larger force is required to dislodge vanes 58 from the groove 36 than would be required in the absence of these developed gripping forces.

A further guarantee that the sleeve portion 56 and tubing end 26 will remain affixed to one another in use even under heavy withdrawal force shocks or loading may be provided as shown in FIG. 7, by applying a circumferential tie or clamp 42 after installation of the sleeve portion within tubing end 26, adjacent end 26 and positioned at a point along sleeve portion 56 intermediate vanes 58 and the junction of the sleeve portion 56 with the transition portion 52 of the converter body 46. The clamp or tie 42 effectively prevents end portions of axial tubing slit 30 from opening up in a manner which would allow converter body 46 to be disengaged from the tubing 24. Clamp 42 cooperates with engaged vanes 58 to limit axial displacement of the converter 40 from the tubing end 26.

Referring now to the left hand portion of FIG. 7, duct transition converter 40 may be connected to the end of a multi-sided wiring duct, such as ducts 12 or 20, by pushing the first end 48 onto the duct end until a leading edge of the duct end engages the forward- stop surface 70 defined by shoulder 68. The duct end is thereby telescopically received within cuff portion 54. Cuff portion 54 has a square cross-sectional configuration, as shown in FIG. 4, having interior side dimensions, i, which is selected to be equal to or slightly less than the corresponding side dimension j of the square duct end 12 or 20, as shown in FIG. 7. Installation of the cuff portion 54 over the duct end causes an outward flexing of the cuff portion 54 wherein the edge surfaces 64 and 66 along cuff portion 54 tend to be spread apart. The resilient configuration of the converter body 46 causes balanced resilient compressive forces to be developed by the surfaces of the cuff portion 54 against the outer surfaces of the duct end. Cooperative biased engagement and enhanced frictional gripping of the duct end is thereby provided. The depth of insertion of the duct end within cuff portion 54 dictated by the positioning of shoulder 68 with respect to first end 48 of converter body 46 is selected to provide a length of overlapping gripping engagement which is sufficient or effective to ensure that only by applying a significant axially directed withdrawal force on the cuff portion, can converter 40 be unmated or dislodged from the duct end. Moreover, the shoulder 68 positioned opposite the slot opening 62 acts as a stiffening gusset which further enhances the resilient gripping response of the cuff portion in use.

The new and improved duct transition converter 40 is also designed so that the duct engagement provided at either the first end 48 or the second end 50 tends to enhance the duct engagement of the opposed end of the converter 40. More particularly, outward flexing of the converter body 46 caused by inserting the cuff portion 54 onto a duct end, causes the outward resilient engagement of the sleeve portion 56 against the tubing end 26 to be increased. Inward compression of the sleeve portion 56 at the second end 50 of converter body 46, caused by installation of the sleeve portion within the tubing end 26 and by tightening the circumferential grip of cinch clamp 42 act in favor of the inward resilient gripping engagement of the cuff portion 54 at first end 48 against the duct end.

Referring again now to FIGS. 1-2, new and improved universal transition connectors 10 incorporate the new and improved duct transition converters 40 of this invention to provide a means for connecting the ends of spaced apart wiring duct elements in a gradually curving manner. Connector 10 may be provided in pre-assembled form or as a kit of parts to be assembled in the field. As shown in FIG. 2, connector 10 includes: a length of flexible tubing which is preferably of a flexible convoluted tubing type, such as tubing 24. The flexible tubing 24 should comprise a resilient thermoplastic material which is preferably rendered flame retardant. A preferred flexible convoluted tubing is a 94 VO flame retardant grade of polypropylene. Flexible tubing or conduit suitable for use in connector 10 is generally available from a number of commercial sources.

Connector 10 further includes a pair of duct transition converters 40 as described above and preferably includes a pair of cinch clamps 42 installed as described in connection with FIG. 7 above.

Generally, the cinch tie or clamp 42 may comprise any tensionable looping strap assembly adapted to circumferentially engage the mated sleeve portion and tubing end of the connector. Suitable items for use as adjustable hose clamps 42 include cable clamp and cable tie products used in the wiring industry. They may be of the one-piece, two piece or three piece types and may be permanent after tensioning or can be of the releasable locking type. If permanent ties are used, the strap may need to be cut for access and a new substitute tie added to re-form the connector 10 if changes in the wiring or cables are needed. Preferably, the clamps 42 are of a releasable, reusable type to avoid waste. An especially preferred clamp for use as clamps 42 is a SNAPPER ® brand adjustable hose clamp available commercially from TYTON Corporation. Other suitable products for use as clamps 42 will readily suggest themselves to those skilled in this art.

As shown in FIGS. 1-2, connector 10 additionally includes a bundle or cable tie 44 positioned over flexible tubing 24 at a point intermediate the length thereof. Cable ties 44 for use herein are well known and may be the same as or different from the adjustable hose clamp 42. One or more cable ties 44 may positioned at various locations along the length of tubing 24. The purpose of cable tie 44 is to prevent the axial slit 30 from opening up in use or buckling open during bending of the connector 10 along the length of tubing 24.

In accordance with the invention, connectors 10 are provided with access openings including axial slit 30 in flexible tubing 24 and slot openings 62 in each of converters 40. When the hose clamps 42 are in a loosened condition, the sleeve portions 56 may be rotated within tubing ends 26 and 28 until each slot opening 62 is aligned with the slit 30 at each end of tubing 24. In this aligned condition, continuous lateral access to the interior wire or cable receiving space 38 and passageways 60 along the entire length of connector 10 is provided enabling wires or cables to be removed, added or replaced from the connector 10 and the overall installation without the need for complete disassembly. Connector 10 provides a connector for making curved transition connections between duct members along six axes of change in a single connector making it universally useful for all or most duct interconnection applications.

Referring now to FIGS. 8-11, an alternate duct transition converter 80 in accordance with the present invention is shown. As shown in FIG. 8, duct transition converter body 80 comprises a converter body 82 including a pair of substantially identical, selectively releasable interlocking hermaphroditic housing halves 84, 84. In assembled form, converter body 80 is similar in most respects to converter body 46 with certain exceptions. Converter body 82 includes a first end 88 defining a cuff portion 90 having a generally square cross-sectional configuration adapted to telescopically receive and grippingly engage the square end of a wiring duct, such as ducts 12 or 20. Converter body 82 also includes a second end 92 including an elongate sleeve portion 94. Instead of having an elongate tapered frusto-conical transition section, converter body 82 has a stepped outer configuration as shown in FIGS. 9-10. The transition from a square to round configuration is defined in converter body 46 by an inner upstanding partition wall 96. A parallel end wall 98 extends inwardly adjacent second end 92. The hermaphroditic housing design of converter body 82 bisects body 82 lengthwise forming a pair of parallel spaced apart elongate edge surfaces 100 and 102 extending along the top of the open side of each housing half 84, 84.

In accordance with this embodiment, each housing half 84 is provided with complimentary releasableinterlocking features for securing the pair of housing halves 84 in mated or assembled condition. More particularly, each housing half 84 includes a pair of perpendicular side panels 104 and 106 adjacent first end 88 for forming cuff portion 90. A generally rectangular resilient tab 108 having a centrally disposed lock aperture 110 extends perpendicularly from edge surface 100 of housing half 84 at a point intermediate cuff portion side panel 104. On the exterior surface of the opposing panel 106 there is provided a rectangular recess 112 having a thin rectangular lock projection 114 generally centered with respect to the length of recess 112 and extending from elongate edge surface 102 to a point intermediate the width of recess 112.

Tab projection 108 is resiliently deflectable, being cantilevered from side panel 104. Accordingly, as two housing halves 84 are brought together so that their elongate edge surfaces 100 and 102 are advanced into abutting surface to surface engagement, the elongate edge surface 100 on a first housing half 84 lies adjacent edge surface 102 on the complimentary housing half 84. Advancing the housing parts together causes tab projection 108 to be deflected outwardly to slide over the outer or top surface of lock projection 114 until the tab edge 116 defined by aperture 110 clears the engaging edge 118 of lock projection 114. At this point, the tab projection 108 is free to reside inwardly to assume a flush condition within recess 112 with respect to the outer surface of complimentary side panel 106 as shown in FIG. 16. In this mated condition, tab edge 116 is engaged on engaging edge 118 in a manner which prevents the housing halves 84 from being separated from each other in use.

As shown in FIG. 16, tab recess 112 is provided with sufficient excess width to leave a clearance or tool-receiving gap 120 for receiving a tool, such as a screw driver or the like, to lift the tab projection 108 out of engaged or locked position with respect to lock projection 114, in order to separate the housing halves 84 to provide access to cables or wires disposed in the interior space defined by the assembled converter body 82.

As shown in FIGS. 8-11, the sleeve forming portion of elongate edge surfaces 100 and 102 are provided with an upstanding lip 122 and a shoulder recess 124, respectively, which cooperate to form an aligning and frictionally engaging lap joint in the sleeve portion 94 of assembled converter body 82.

Each of the upstanding walls within housing half 84, namely partition wall 96 and end wall 98, are provided with semi-circular or concave recesses or cut-outs 126 and 128, respectively. Cut outs 126 and 128 form a pair of sleeve-engaging circumferential clamping sections in the assembled converter body 82. More particularly, the end of a flexible convoluted tubing such as tubing 24 is laid within the sleeve forming portion 94 of housing half 84. The outer surface of flexible convoluted tubing 24 includes a plurality of spaced apart indentations 130, shown in FIG. 7, corresponding to ribs 34 defined along the inner facing surface 32 of tubing 24. The tubing 24 can be pressingly engaged into housing half 84 so than an indentation 130 is forced onto and grippingly engages each of cut outs 126 and 128. Thereafter, when the complimentary housing half 84 is mated to the first housing half 84, its cut outs 126 and 128 are grippingly engaged in the opposite sides of the indentations 130. In this manner an end of flexible tubing 24 is telescopically received and affixed within the sleeve portion 94 of converter body 82.

After the flexible tubing is affixed into the sleeve portion 94 and housing halves 84 has been matingly engaged to form the converter body 82, the cuff portion 90 may be press-fit over the end of a wiring duct, such as 12 or 20, to form the duct connection.

Referring now to FIGS. 12-17, another hermaphroditic duct converter 150 is shown. Converter 150 is similar in most respects to duct converter 80 shown in FIGS. 8-11, with the exception that its sleeve-forming sections 152, also includes releasable interlocking features in addition to the tab 108 and lock projection 114 disposed in the cuff forming portion 154.

More particularly, as shown in FIGS. 12-17, each hermaphroditic housing half includes an elongate upwardly projecting latch arm 156 having a free end 158 with an outwardly projecting cantilevered locking barb 160. Latch arm 154 extends above an elongate edge surface 100 at a point intermediate the length of sleeve forming portion 152. A complimentary latch window 162 is disposed through an opposing side wall portion of sleeve forming section 152, spaced downwardly from the opposite elongate edge surface 102. A latch guide recess 164 is defined along the inner surface of sleeve forming portion 152 extending between latch window 162 and elongate edge surface 102. Guide recess 164 thereby defines a reduced thickness sidewall portion 166 extending between elongate edge surface 102 and latch window 162, and defines a latch engaging surface 168 at window 162.

Locking barb 160 forms a latch shoulder 170 and is provided with an angled cam surface 172. Cam surface 172 causes inward deflection of latch arm 156 as it engages the upper end of sidewall portion 166 when the housing halves are brought together to their assembled condition. Latch barb 160 slides within latch guide recess 164 until it clears latch window 162. Latch arm 156 then resiles outwardly causing latch shoulder 170 to lockingly engage surface 168. Latch barb 160 can be inwardly deflected by a tool to release the latch arm 156 from the latch window 162 to disengage the hermaphroditic housing halves from their mated condition.

Although the present invention has been described with reference to certain preferred embodiments, modifications or changes may be made therein by those skilled in this art without departing from the scope and spirit of this invention as defined in the appended claims.

I claim:

1. A wiring duct converter for making a transition connection between an end of a multi-sided ducting member and an end of a cylindrical ducting member, said converter comprising: an elongate generally tubular converter body having a first end with a resilient cuff portion for clamping engagement about said multi-sided duct end and having an opposed second end with a sleeve portion including means for cooperatively engaging the end of said cylindrical duct member, said converter body defining an internal passageway for receiving a plurality of wires or cables, said converter body further including means for providing lateral access to said passageway to permit wires or cables to be added or removed from said passageway in use.

2. A converter as in claim 1, wherein said multi-sided duct end and said cuff portion have a four-sided configuration.

3. A converter as in claim 2, wherein said four-sided configuration is rectangular.

4. A converter as in claim 2, wherein said four-sided configuration is square.

5. A converter as in claim 1, wherein said converter body is a unitary, one-piece body.

6. A converter as in claim 5, wherein said access means includes an axial slit extending the entire length of said body, such that said body has a resilient, generally C-shaped cross-sectional configuration.

7. A converter as in claim 1, wherein said converter body comprises a unitary thermoplastic molded body.

8. A converter as in claim 1, wherein said converter body comprises a pair of matable body parts including releasable interlocking means.

9. A converter as in claim 8, wherein each said body part is a unitary thermoplastic molding.

10. A converter as in claim 8, wherein said body parts are hermaphroditic body halves.

11. A converter as in claim 10, wherein each hermaphroditic body half includes a pair of parallel elongate edges extending between the first and second ends.

12. A converter as in claim 11, wherein said releasable locking means includes a resilient tab extending perpendicularly from a first elongate edge having a lock aperture defined therein and a tab receiving recess with a centrally disposed lock projection defined in an outer surface of said body half adjacent the other elongate edge, said tab and said lock projection being positioned such that when two said hermaphroditic body halves are assembled together so that their elongate edges are in abutting relation, the lock projections on each body half are received in the tab apertures of the other body half.

13. A converter as in claim 12, wherein said tab and lock projection are disposed intermediate the cuff portion of the body half.

14. A converter as in claim 12, wherein said releasable locking means further includes a resilient latch arm having a free end with a locking barb cantilevered outwardly therefrom, said latch arm extending upwardly from one said elongate surface and a latch window deposed in a sidewall adjacent the opposing elongate edge, said latch arm and latch window being disposed intermediate the sleeve portion of said body half such that when two said body halves are assembled together so that their elongate edges are advanced into abutting relation, the latch arms are deflected inwardly by a portion of the sidewall intermediate the elongate edge and said window, until the barbs clear said window, permitting the latch arms to resile outwardly causing the barbs to be lockingly engaged within the windows.

15. A converter as in claim 1, wherein said cuff portion is adapted to telescopingly receive the multi-sided duct end within the cuff portion, and said converter body further includes a shoulder in said passageway spaced from the first end for defining a forward stop in said cuff portion.

16. A flexible transition connector for connecting end portions of a pair of spaced apart wiring duct members, said connector comprising: a length of flexible tubing having a pair of opposed ends and having a longitudinally extending axial slit extending the length thereof defining an interior space accessible through said slit for receiving a plurality of wires or cables in loose or bundled form; a pair of transition converters, each transition converter including an elongate generally tubular converter body having a first end with a resilient cuff portion having a first cross-sectional configuration for clampingly engaging an end portion of one said wiring duct and having an opposed second end with an elongate sleeve portion having a second generally circular cross-sectional configuration, said converter body defining an internal passageway for receiving a plurality of wires or cables, the sleeve portion of each transition converter being telescopically received in and engaging an end of said flexible tubing, each said transition converter further including means for cooperatively engaging the respective end of said flexible tubing, each said transition converter body further including means for providing lateral access to said passageway to permit wires or cables to be added or removed from said passageway in use; and clamp means for releasably securing each tubing end to one said sleeve portion, whereby said connector may be installed by pushing the first end of each converter onto the end portions of said pair of wiring ducts so that each end portion is telescopically received in and clampingly engaged in a cuff portion.

17. A connector as in claim 16, wherein said flexible tubing is flexible convoluted tubing including a continuous peripheral sidewall having an inner facing surface defined by a plurality of spaced-apart ribs alternating with a plurality of spaced-apart grooves.

18. A connector as in claim 17, wherein said flexible convoluted tubing includes a longitudinally extending slit defined therein extending between the ends, such that said tubing has a resilient, generally C-shaped cross-sectional configuration.

19. A connector as in claim 17, wherein said cooperative engagement means on said sleeve portion comprises a plurality of radially spaced-apart vanes projecting circumferentially outwardly from the sleeve portion for biasingly engaging a said groove in the inner surface of said flexible convoluted tubing when said converter is resiliently inwardly compressed and the sleeve portion is telescopically inserted into an end of said convoluted tubing.

20. A kit of parts for making a flexible transition connector for connecting end portions of a pair of spaced apart wiring ducts, said kit comprising: a length of flexible tubing having a pair of opposed ends and having a longitudinally extending axial slit extending the length thereof defining an interior space accessible through said slit for receiving a plurality of wires or cables in loose or bundled form; a pair of transition converters, each transition converter including an elongate generally tubular converter body having a first end with a resilient cuff portion having a first cross-sectional configuration for clampingly engaging an end portion of one said wiring duct and having an opposed second end with an elongate sleeve portion having a second generally circular cross-sectional configuration, said converter body defining an internal passageway for receiving a plurality of wires or cables, the sleeve portion of each transition converter being adapted to be closely telescopically received in and engaging an end of the flexible tubing, each said transition converter further including means for cooperatively engaging the respective end of said flexible tubing, each said transition converter body further including means for providing lateral access to said passageway to permit wires or cables to be added or removed from said passageway in use; and a pair of clamps receivable over the ends of said tubing for releasably securing each tubing end to one said sleeve portion.

21. A wiring duct converter for making a transition connection between an end of a multi-sided ducting member and an end of a cylindrical ducting member, said converter comprising: an elongate generally tubular converter body having a first end with a resilient cuff portion for clamping engagement about said multi-sided duct end and having an opposed second end with a sleeve portion including means for cooperatively engaging the end of said cylindrical duct member, said converter body defining an internal passageway for receiving a plurality of wires or cables, said converter body further including means for providing lateral access to said passageway including an axial slit extending the entire length of said body to permit wires or cables to be added or removed from said passageway in use and providing said body with a resilient, generally C-shaped cross-sectional configuration.

22. A wiring duct converter for making a transition connection between an end of a multi-sided ducting member and an end of a cylindrical ducting member, said converter comprising: an elongate generally tubular converter body having a first end with a resilient cuff portion for telescopically receiving and clampingly engaging said end of said multi-sided duct and having an opposed second end with a sleeve portion including means for cooperatively engaging the end of said cylindrical duct member, said converter body defining an internal passageway for receiving a plurality of wires or cables, said converter body further including means for providing lateral access to said passageway to permit wires or cables to be added or removed from said passageway in use.

* * * * *